Nov. 8, 1966 H. NITSCH 3,283,509
LIFTING ENGINE FOR VTOL AIRCRAFT
Filed Feb. 20, 1964

INVENTOR:
HARRI NITSCH

BY

Michael S. Striker
his ATTORNEY 3,283,509
LIFTING ENGINE FOR VTOL AIRCRAFT
Harri Nitsch, Munich, Germany, assignor to Junkers Flugzeug- und Motorenwerke Aktiengesellschaft, Munich, Germany
Filed Feb. 20, 1964, Ser. No. 346,199
Claims priority, application Germany, Feb. 21, 1963, J 23,218
1 Claim. (Cl. 60—226)

The present invention relates to lifting engines for VTOL aircraft, and more particularly to an improved two-cycle lifting engine for such vehicles.

In many presently known types of VTOL aircraft, the lifting engine comprises a multiblade lift reactor fan which draws large quantities of air to compress it and to direct it downwardly in order to produce a lifting thrust. The fan is driven by a power plant including a combustion chamber which discharges gaseous products of combustion against a ring of turbine blades so that the gases produce a second lifting thrust. Such two-cycle lifting engines constitute a substantial improvement over one-cycle lifting engines for VTOL aircraft in which the lifting thrust is produced solely by products of combustion issuing from an exhaust nozzle. In one-cycle lifting engines, the products of combustion are produced in a combustion chamber which is provided for the sole purpose of rotating the turbine of the power plant.

In certain other types of VTOL aircraft, the lift reactor fan of the lifting engine is driven by exhaust gases which are produced by the power plant for wing-supported airplane flight. An advantage of such VTOL aircraft is that the number of power plants is reduced because the same power plants which produce necessary thrust for wing-supported airplane flight may be used to provide thrust for vertical flight or for hovering. However, the deflection of exhaust gases from power plants for wing-supported flight to the lift reactor fans presents a series of problems, particularly as regards heat insulation and stability of the aircraft.

Accordingly, it is an important object of this invention to provide an improved VTOL aircraft, also called converticraft, of the two-cycle type wherein each lifting engine is independent of the power plant or power plants for wing-supported airplane flight.

Another object of the invention is to provide an improved two-cycle lifting engine for VTOL aircraft.

A further object of the invention is to provide a very compact and lightweight lifting engine for VTOL aircraft which consumes small quantities of fuel, which may be accommodated in the wing of an aircraft, and which may be installed with minimal alterations in many types of conventional aircraft for wing-supported flight.

An additional object of the invention is to provide an improved lift-reactor fan for lifting engines of VTOL aircraft.

With the above objects in view, one feature of the invention resides in the provision of a lifting engine for VTOL aircraft which comprises a lift reactor fan and a power plant serving to drive the fan. The fan includes a hub and hollow rotor blades extending substantially radially of the hub and having inlet openings adjacent to the hub so that, when the fan rotates, the rotor blades draw streams of air which enter through the inlet openings and are compressed on their way toward and through the open tips of the blades. The power plant includes an annular combustion chamber which is adjacent to the open tips of and is arranged to receive compressed air from the rotor blades, and means for admitting fuel into the combustion chamber so that such fuel mixes with compressed air to form a combustible mixture which, on ignition thereof, develops products of combustion issuing through exit orifices provided in the combustion chamber to drive the fan to produce a first lifting thrust. The left reactor fan produces additional streams of compressed air which pass between the rotor blades when the fan rotates so that such additional streams of air produce a second lifting thrust.

The novel features which are considered as characteristic of the invention are set forth in particular in the appended claim. The improved lifting engine itself, however, both as to its construction and its mode of operation, together with additional features and advantages thereof, will be best understood upon perusal of the following detailed description of certain specific embodiments with reference to the accompanying drawings, in which:

Figure 1:
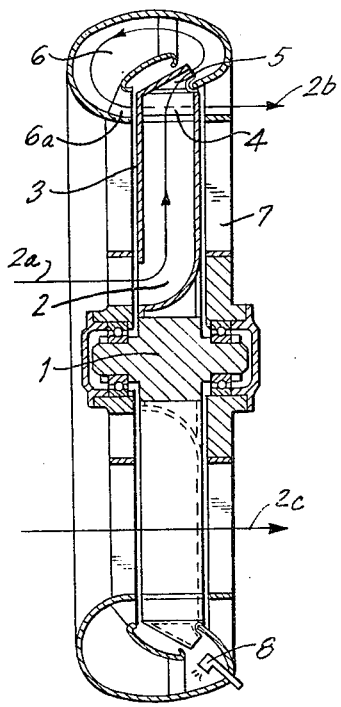
FIG. 1 is an axial section through a lifting engine which embodies one form of the invention.
Figure 2:
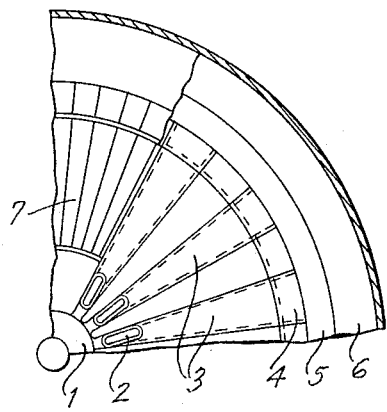
FIG. 2 is a fragmentary end elevational view as seen from the left-hand side of FIG. 2.

Referring to FIGS. 1 and 2, there is shown one of two lifting engines in a VTOL aircraft. This engine includes a lift reactor fan including a hub 1 and a series of radially extending hollow rotor blades 3. The root of each rotor blade 3 is provided with an inlet opening 2 which draws air from the atmosphere, and such air is compressed on its way to and through the open tip of the respective rotor blade to enter an inclined hollow turbine blade 4. The blades 4 form part of a rotary turbine wheel which is secured to the fan and which discharges highly compressed air into an annular space 5 leading to a fixed annular combustion chamber 6. The products of combustion developing an ignition of the fuel-air mixture in the chamber 6 are discharged through exit orifices 6a to flow axially between the turbine blades 4 and around a fixed guide wheel 7. The combustion chamber 6 accommodates a fuel admitting device including a series of fuel injection nozzles 8 one of which is illustrated in the lower part of FIG. 1. The turbine blades 4 are secured to the rotor blades 3 and the compression chamber 6 is stationary.

The streams of air entering through the inlet openings 2 at points close to the hub 1 (arrow 2a in FIG. 1) flow radially outwardly, first through the rotor blades 3 and thereupon through the inclined turbine blades 4 to enter the space 5 and thereupon the combustion chamber 6. The thus compressed streams of air are admixed to jets of fuel delivered by the nozzles 8, and the resulting combustible mixture is ignited to develop products of combustion which are discharged through the exit orifices 6a and through the gaps between the inclined turbine blades 4, see the arrow 2b. A ring of fixed vanes forming the guide wheel 7 is located in the path of compressed air streams flowing through the gaps between the rotor blades 3, see the arrow 2c.

A very important advantage of the improved lifting engine is that the lift reactor fan performs two functions, namely, that of an axial low-pressure compressor and that of a radial high-pressure compressor. This reduces the overall weight and axial height of the lifting engine. Also, the lifting engine consumes little fuel which is due to the fact that it operates on the two-cycle principle with a high mass ratio.

Figure 3:
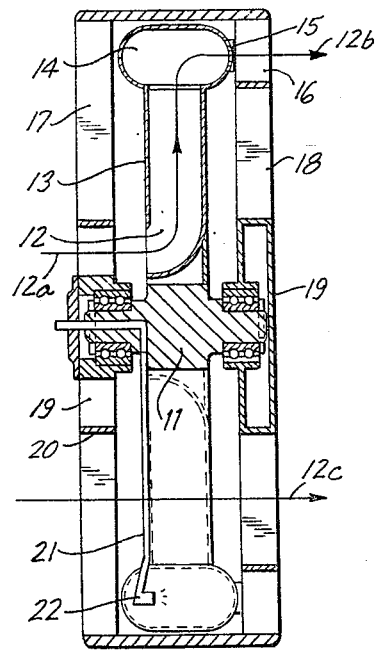
FIG. 3 is an axial section through a modified lifting engine.
Figure 4:
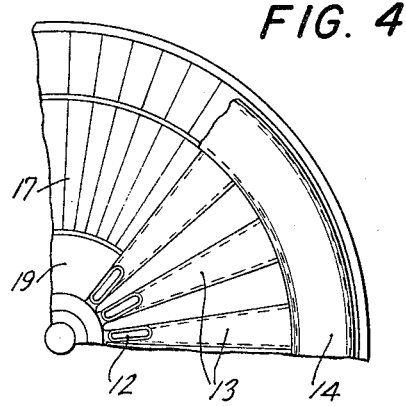
FIG. 4 is a fragmentary end elevational view as seen from the left-hand side of FIG. 3.

FIGS. 3 and 4 illustrate a modified lifting engine for VTOL aircraft which comprises a rotary combustion chamber. The engine includes a lift reactor fan having a hub 11 and a series of hollow rotor blades 13 which extend radially of the hub. The root of each rotor blade 13 is provided with an inlet opening 12 which draws air into the interior of the respective rotor blade, and such air is compressed while flowing radially and away from the hub 11. An annular combustion chamber 14 is connected with the hollow tips of the rotor blades 13 and accommodates a fuel admitting device including a series of fuel injection nozzles 22. This combustion chamber is further provided with a series of angularly distributed exhaust nozzles 15 having inclined exit orifices which discharge products of combustion substantially tangentially of the engine and at a slight angle to the axis of the hub 11.

In order to take advantage of the remaining energy, the streams of combustion products emerging from the exit orifices of the exhaust nozzles 15 are deflected in the axial direction of the engine by the vanes of a fixed rear guide wheel 16. The engine further comprises a front guide wheel 17, and a second rear guide wheel 18. A second hub 20 which is surrounded by the front guide wheel 17 performs no supporting function and serves solely to control the flow of air to the inlet openings 12. This second hub 20 is carried by a support 19.

The streams of air (arrow 12a) which are drawn into the inlet openings 12 flow radially through the rotor blades 13 and are compressed on their way into the revolving combustion chamber 14. Such highly compressed streams of air mix with jets of fuel issuing from the nozzles 22 and, an ignition of the resulting mixture, the products of combustion are discharged through the exit orifices of the exhaust nozzles 15. These nozzles direct the streams of combustion products at a slight angle against the vanes of the fixed guide ring 16 which in turn deflects the products of combustion axially (arrow 12b) to produce a first upward thrust.

The streams of air flowing between the vanes of the fixed ring 17 pass between the hollow rotor blades 13 (arrow 12c) and thereupon between the vanes of the fixed ring 18 to produce a second lifting thrust. The vanes of the fixed ring 19 direct streams of air into the inlet openings 12.

One or more lifting engines of the type shown in FIGS. 1 and 2 may be installed in each wing or on the fuselage of a VTOL aircraft.

The nozzles 22 receive fuel through conduits extending axially of the hub 11 and thereupon radially along the rotor blades 13.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

A lifting engine for VTOL aircraft, comprising a lift reactor fan including a hub and a plurality of hollow rotor blades extending substantially radially of said hub, each of said rotor blades having an inlet opening adjacent to said hub and an open tip so that said rotor blades draw streams of air through said inlet openings when the fan rotates and such streams undergo compression on their way toward and through said open tips; and a power plant for rotating said fan, said power plant comprising a ring of inclined hollow turbine blades each connected to and communicating with the open tip of one of said rotor blades, a fixed annular combustion chamber adjacent to the open tips of said rotor blades, said combustion chamber being arranged to receive compressed air from said turbine blades and having annularly arranged orifice means adjacent to said turbine blades, and means for admitting fuel into said combustion chamber so that such fuel mixes with compressed air to form a combustible mixture which, on ignition thereof, yields products of combustion issuing from said exit orifice means to rotate said blades and to produce a lifting thrust.

References Cited by the Examiner

UNITED STATES PATENTS

| | | | |
|---|---|---|---|
| 2,592,938 | 4/1952 | McNaught | 60—35.6 |
| 2,690,809 | 10/1954 | Kerry | 60—39.35 X |
| 2,978,205 | 4/1961 | David | 244—23 |
| 3,007,309 | 11/1961 | Meyer | 60—39.35 |
| 3,170,285 | 2/1965 | Ferri | 244—23 X |

FOREIGN PATENTS

| | | |
|---|---|---|
| 1,033,849 | 4/1953 | France. |
| 880,606 | 10/1961 | Great Britain. |

MARK NEWMAN, *Primary Examiner.*

D. HART, *Assistant Examiner.*